(12) United States Patent
Averbuch et al.

(10) Patent No.: US 8,665,753 B2
(45) Date of Patent: Mar. 4, 2014

(54) SIMULTANEOUS SETUP OF A WIRELESS NETWORK ADAPTER AND A NETWORK HOST DEVICE

(75) Inventors: Aaron Hyman Averbuch, Seattle, WA (US); William Tuttle, Terrace, WA (US); Xin Liu, Seattle, WA (US); Mike Mouawad, Laguna Hills, CA (US); Kendra S. Harrington, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 13/206,429

(22) Filed: Aug. 9, 2011

(65) Prior Publication Data

US 2013/0039213 A1 Feb. 14, 2013

(51) Int. Cl.
*H04W 76/02* (2009.01)
(52) U.S. Cl.
USPC ............................. 370/254; 370/331; 709/238
(58) Field of Classification Search
USPC .......................................................... 370/254
See application file for complete search history.

(56) References Cited

U.S. PATENT DOCUMENTS

| | | | |
|---|---|---|---|
| 2006/0143621 A1* | 6/2006 | Wang ............................ | 719/327 |
| 2007/0111568 A1* | 5/2007 | Ferrari et al. ................. | 439/131 |
| 2008/0016558 A1* | 1/2008 | Aull et al. ........................ | 726/9 |
| 2008/0095086 A1* | 4/2008 | Linkola et al. ................ | 370/310 |
| 2011/0171903 A1* | 7/2011 | Toebes ............................ | 455/14 |

OTHER PUBLICATIONS

Belkin, Wireless G USB Network Adapter, Year: 2008.*
Belkin, Wireless Router, Year: 2003.*

* cited by examiner

*Primary Examiner* — Anh-Vu Ly
*Assistant Examiner* — Tejis Daya
(74) *Attorney, Agent, or Firm* — Patterson & Sheridan, LLP

(57) ABSTRACT

A system and method for causing concurrent setup of a wireless network adapter and a network host device. The method involves receiving a request to install either a wireless network adapter or a network host device. If the request is to install the wireless network adapter, then the method further involves detecting that the network host device is not yet installed, and prompting a user to connect to the network host device. Alternatively, if the request is to install the network host device, then the method further involves detecting that the wireless network adapter is not yet installed, and prompting the user to connect to the wireless network adapter. The method also involves causing a connection to be established between the wireless network adapter and the network host device.

20 Claims, 11 Drawing Sheets

SIMULTANEOUS SETUP OF A WIRELESS NETWORK ADAPTER AND A NETWORK HOST DEVICE

BACKGROUND

1. Technical Field

The disclosure relates generally to home wireless networking and, more specifically, to a system and method for simultaneous setup of a wireless network adapter and a wireless router that implements a wireless access point.

2. Description of the Related Art

A home network is used to provide Internet connectivity and data sharing among computing devices within a home that are connected to that network. To allow computing devices to be placed remotely from one another and/or from the network router, many home networks are fully or partially wireless. As is well-understood, computing devices include desktop computers, laptop computers, tablets, mobile phones, digital music/mp3 players, personal digital assistants (PDAs), printers, set-top boxes, etc. Wireless home networks typically include a wireless router that is hard wired to a modem. The modem, which is often provided by a telephone or cable company, is connected to an external network, such as the Internet, and allows information to flow between the external network and the home network. Each computing device in the home network is connected to the wireless router through a wireless network adapter that is either internal or external to the computing device. Oftentimes, when initially setting up a wireless home network, a user purchases the wireless network adapter and the wireless router at the same time. In such cases, the wireless network adapter and the wireless router have to be set up simultaneously or in parallel, which may prove difficult for the user.

One approach to setting up a wireless network adapter and a wireless router in parallel is to start by configuring the wireless router. Here, the user connects the wireless router to the modem and, in one instance, places the installation disk for the wireless router into a computer that is to be connected to the home network. As is well-known, multiple techniques for setting up the wireless router can be implemented. However, the computer needs to initiate a wireless connection with the wireless router in order to guide the wireless router through the setup configuration process. If the computer does not yet have the wireless network adapter installed, then the computer is not able to initiate the wireless connection needed to configure the wireless router. Consequently, the user is unable to complete the configuration of the wireless router.

Another approach to setting up a wireless network adapter and wireless router in parallel is to start by configuring the wireless network adapter. Here, the user couples the wireless network adapter to a computer and places the installation disk for the wireless network adapter into the computer. However, the wireless network adapter may need to connect to a wireless network, associated with a configured wireless router, in order to complete the configuration of the wireless network adapter. If the wireless router is not configured, then the computer is not able to initiate the wireless connection needed to complete the configuration of the wireless network adapter. Consequently, the user is unable to complete the configuration of the wireless network adapter.

In yet another approach, the user first connects the wireless router to the computer with a hard-wired connection to configure the wireless router, thereby creating a wireless home network. Then, the user disconnects the wireless router from the computer, couples the wireless network adapter with the computer, and places the installation disk for the wireless network adapter into the computer. The installation process for the wireless router is then able to run to completion by connecting the wireless network adapter to the recently-created wireless home network. However, this last approach is inconvenient for the user and possible only if the wireless router is positioned near the computer and the user has a cable that can be used to implement the hard-wired connection available.

As the foregoing illustrates, what is needed in the art is a more efficient and user-friendly approach for in parallel setting up a wireless network adapter and a wireless router in a wireless home network.

BRIEF DESCRIPTION OF THE DRAWINGS

So that the manner in which the features of the present disclosure can be understood in detail, a more particular description of the disclosure may be had by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective embodiments.

DESCRIPTION OF EXAMPLE EMBODIMENTS

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One embodiment sets forth a method for simultaneous setup of a wireless network adapter and a network host device. The method includes the step of receiving a request to install either a wireless network adapter or a network host device. The network host device is configured to store a network state model that includes representations of different computing devices in a network associated with the network host device and different services provided by the network. If the request is to install the wireless network adapter, then the method further includes the step of detecting that the network host device is not yet installed, and prompting a user to plug in the network host device. Alternatively, if the request is to install the network host device, then the method further includes the step of detecting that the wireless network adapter is not yet installed, and prompting the user to plug in the wireless network adapter. The technique also includes the step of causing a connection to be established between the wireless network adapter and the network host device.

One advantage of the disclosed method is that the method provides a more efficient and user-friendly approach for concurrent setup of a wireless network adapter and a network host device in a wireless home network. As a result, a user is able to install a wireless network adapter and a network host device in parallel without encountering difficulties.

DETAILED DESCRIPTION OF THE FIGURES

Figure 1A:
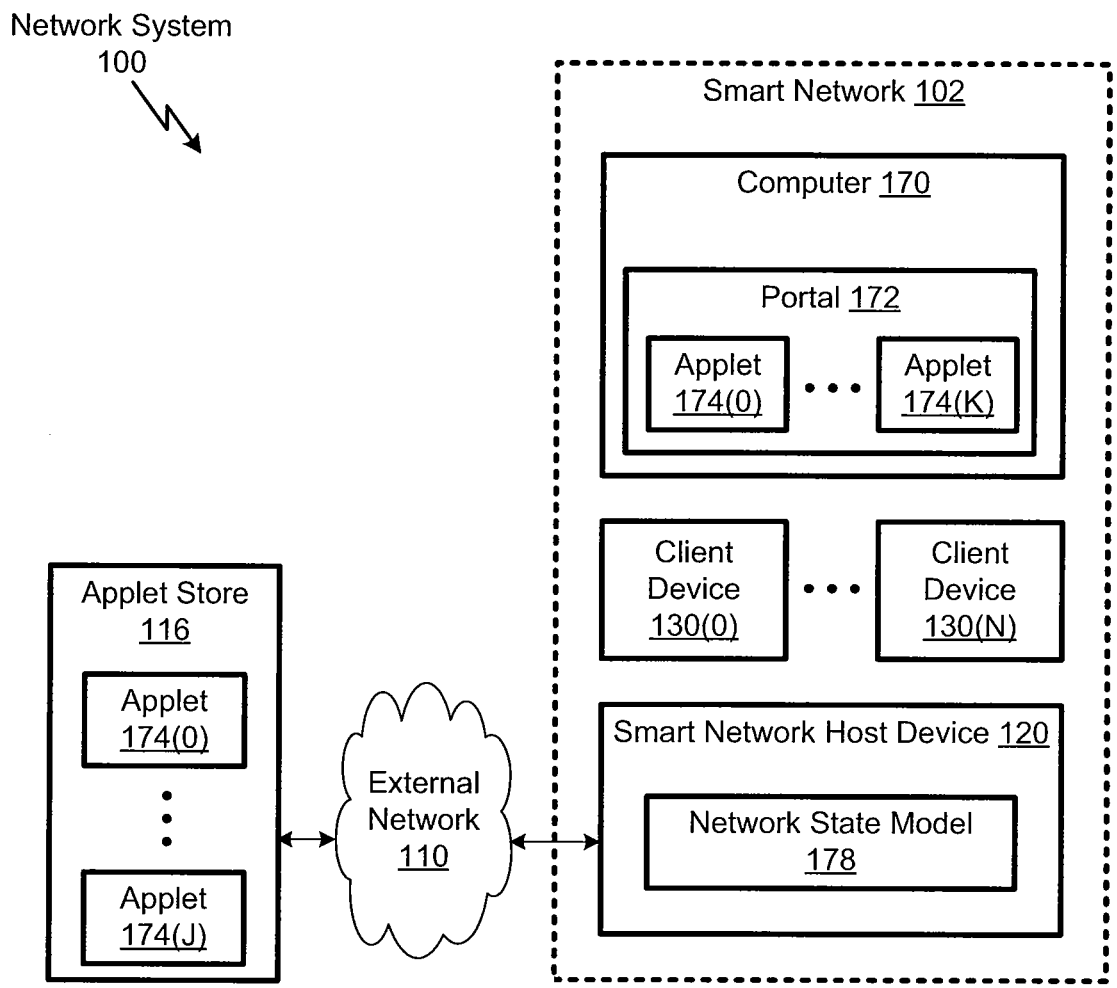
FIG. 1A is an exemplary illustration of an overarching network system, according to one example embodiment.

FIG. 1A is an exemplary illustration of an overarching network system 100, according to one example embodiment. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
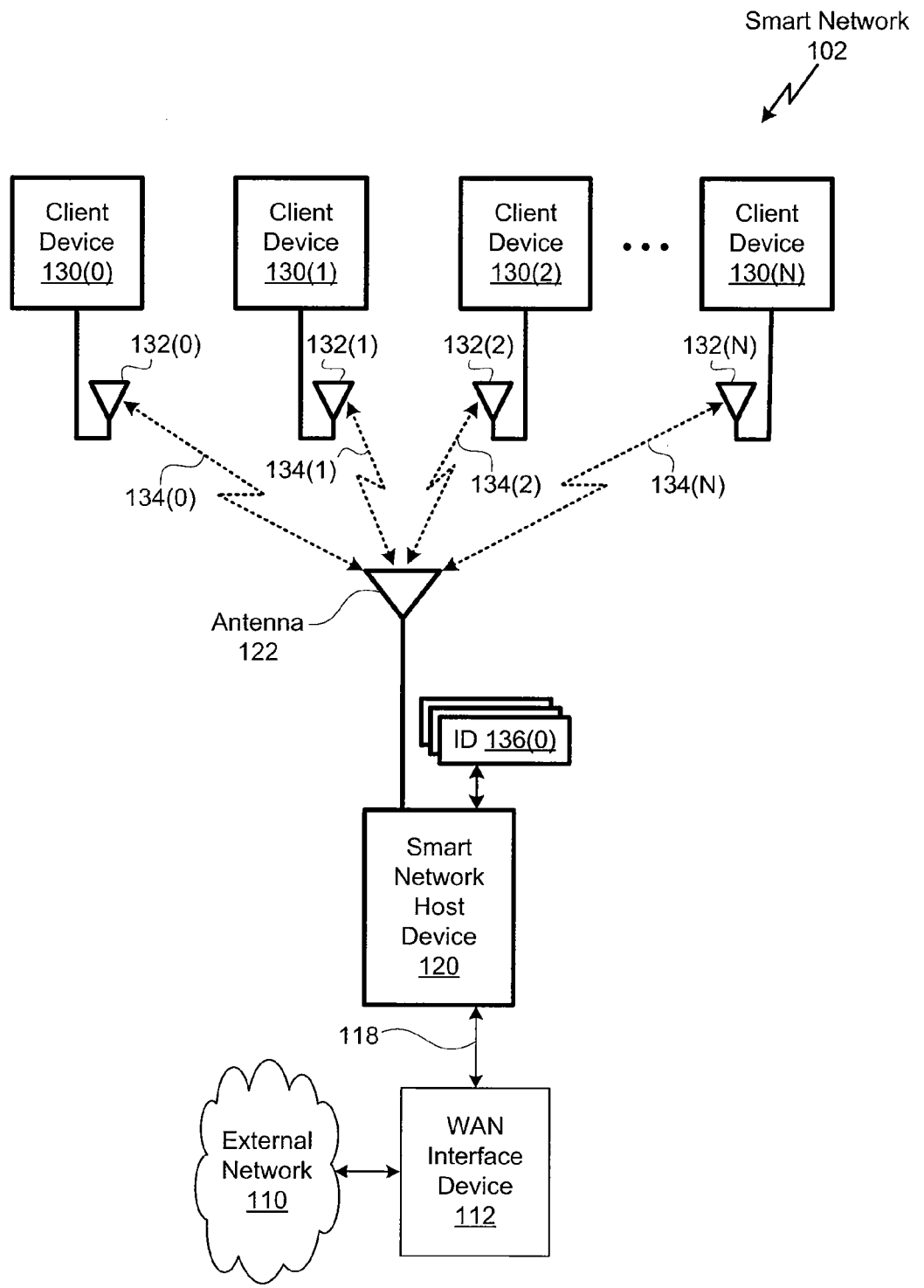
FIG. 1B illustrates the smart home network of FIG. 1A, according to one example embodiment.

FIG. 1B illustrates the smart home network 102 of FIG. 1A, according to one example embodiment. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing from the scope and spirit of the present disclosure. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB™) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
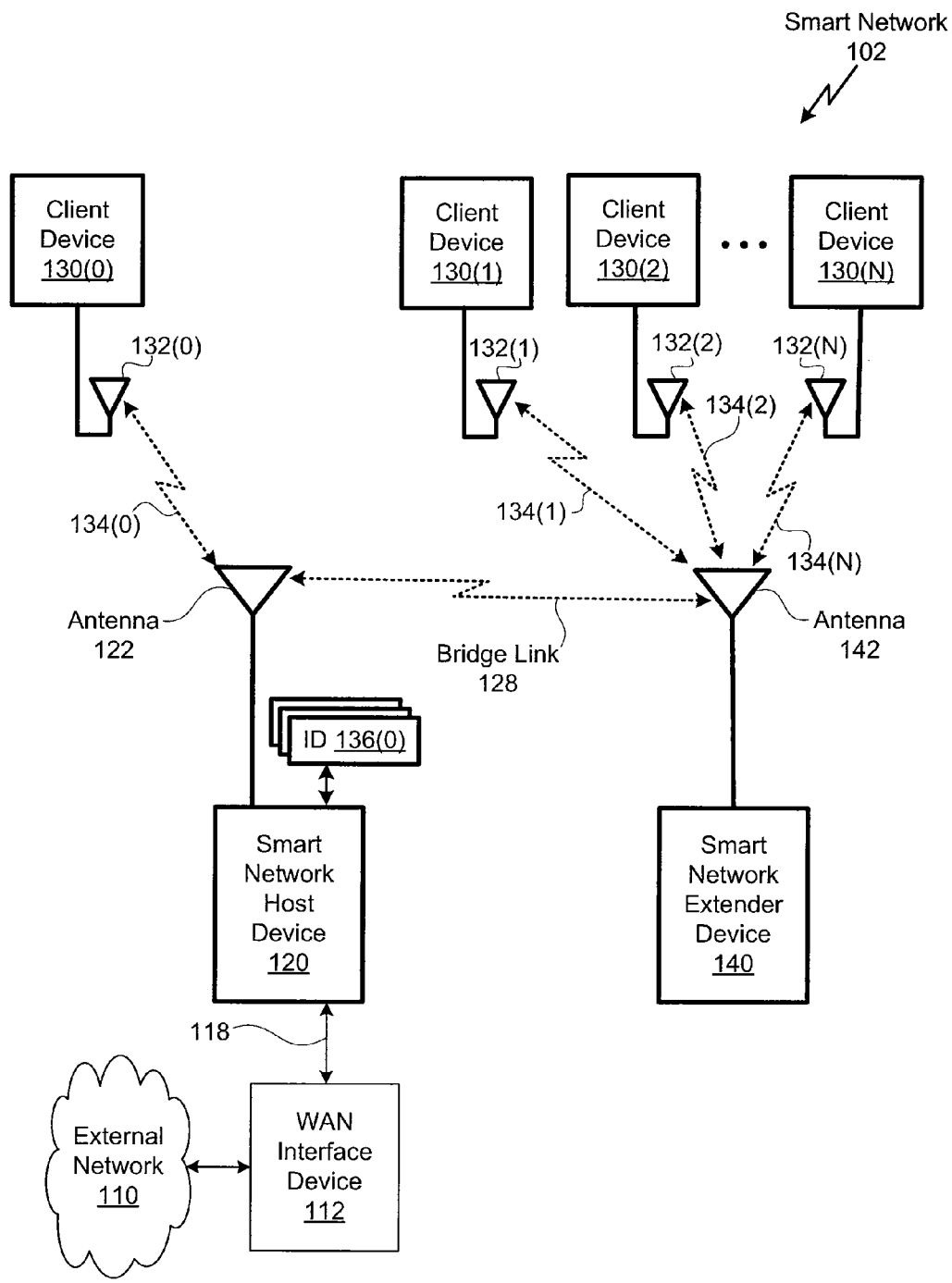
FIG. 1C illustrates the smart home network of FIG. 1A, according to another example embodiment.

FIG. 1C illustrates the smart home network 102 of FIG. 1A, according to another example embodiment. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
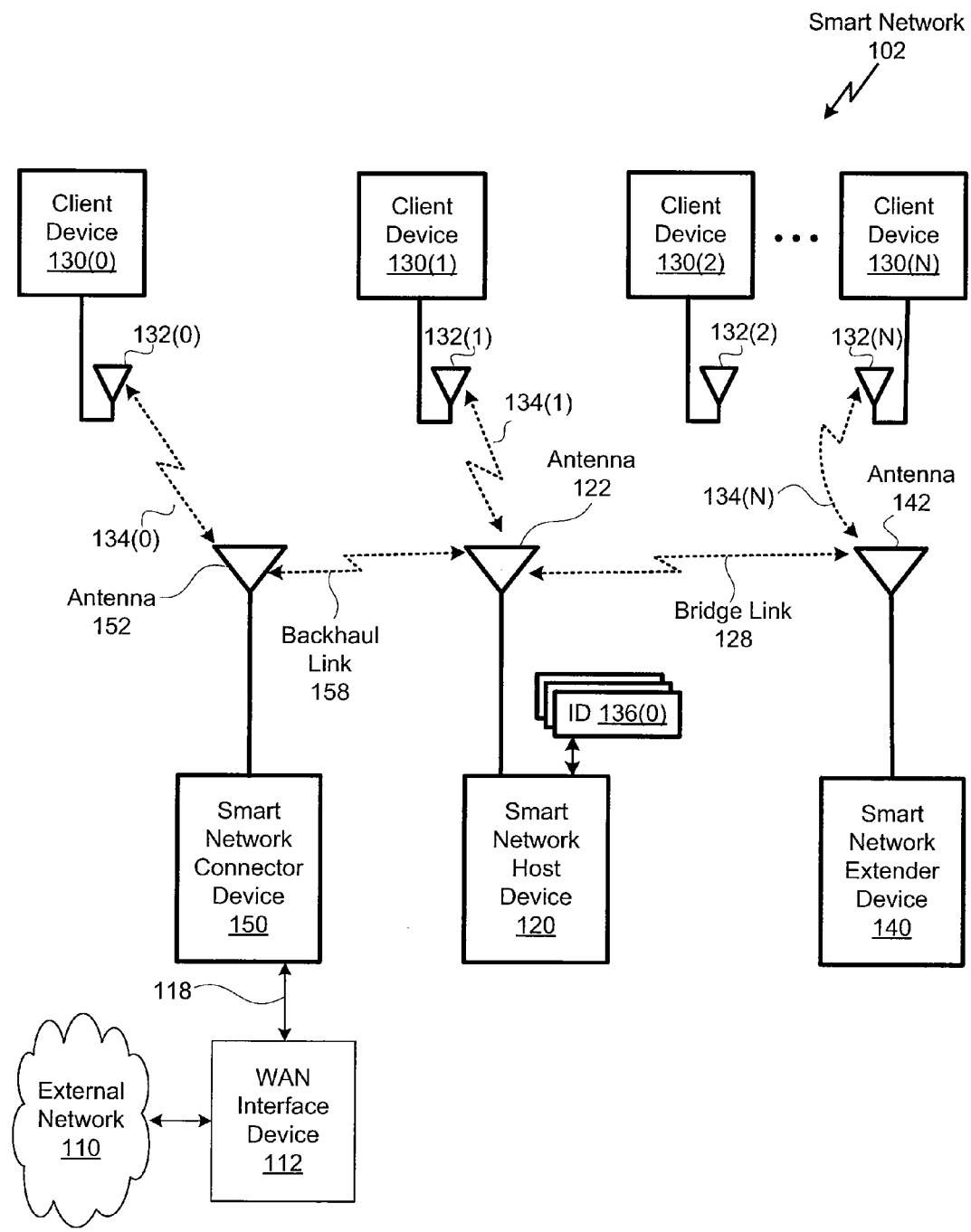
FIG. 1D illustrates the smart home network of FIG. 1A, according to yet another example embodiment.

FIG. 1D illustrates the smart home network 102 of FIG. 1A, according to yet another example embodiment. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
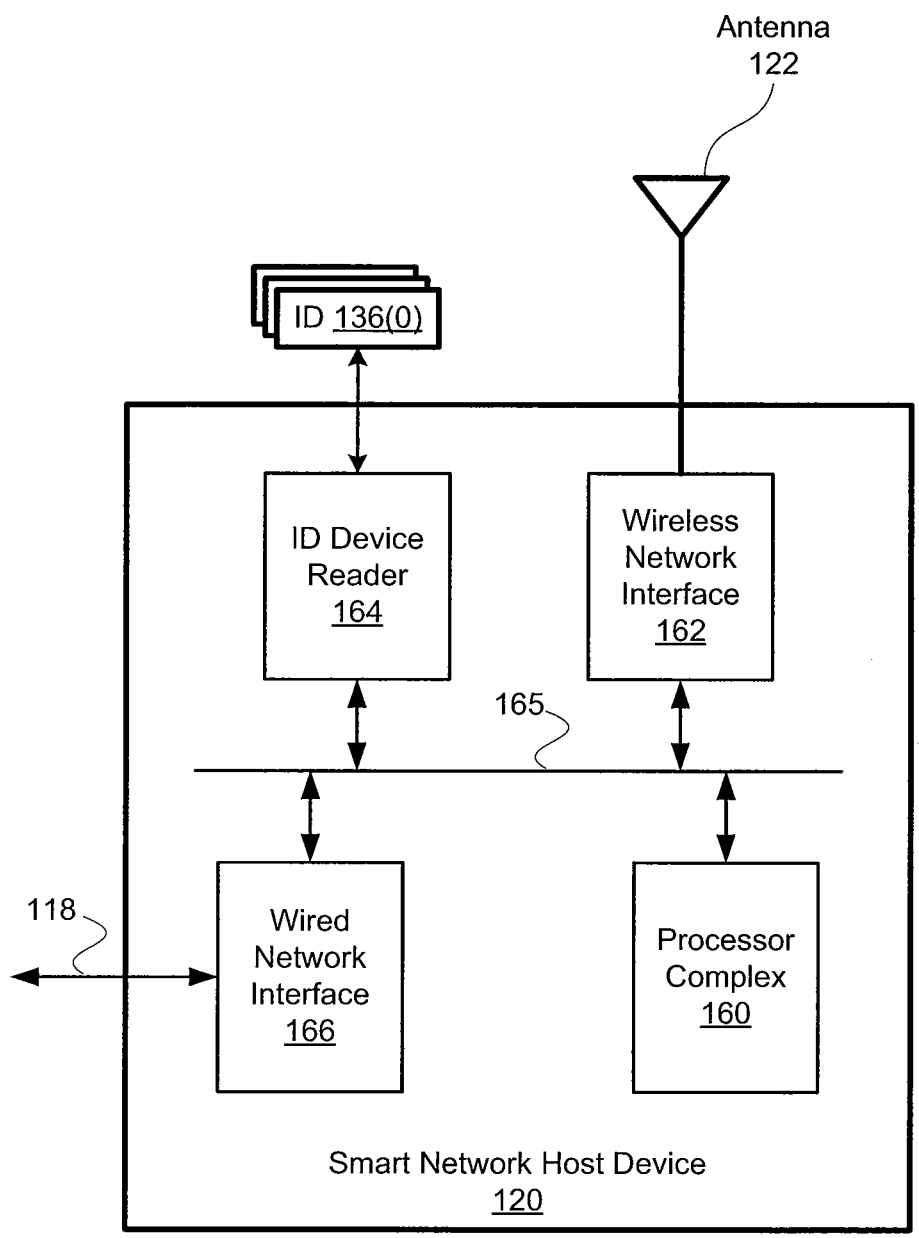
FIG. 1E is a more detailed illustration of the network host device of FIG. 1A, according to one example embodiment.

FIG. 1E is a more detailed illustration of the smart network host device 120 of FIG. 1A, according to one example embodiment. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
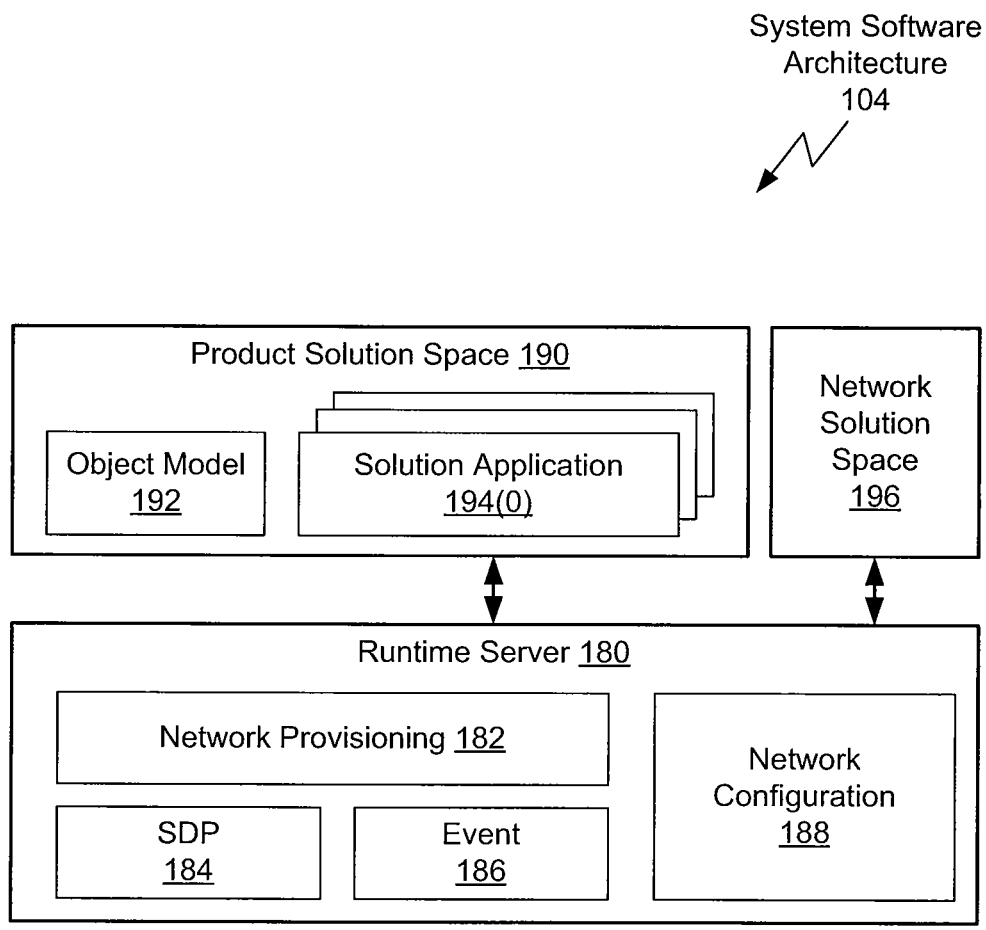
FIG. 1F illustrates a system software architecture for the network host device of FIG. 1A, according to one example embodiment.

FIG. 1F illustrates a system software architecture for the network host device of FIG. 1E, according to one example embodiment. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
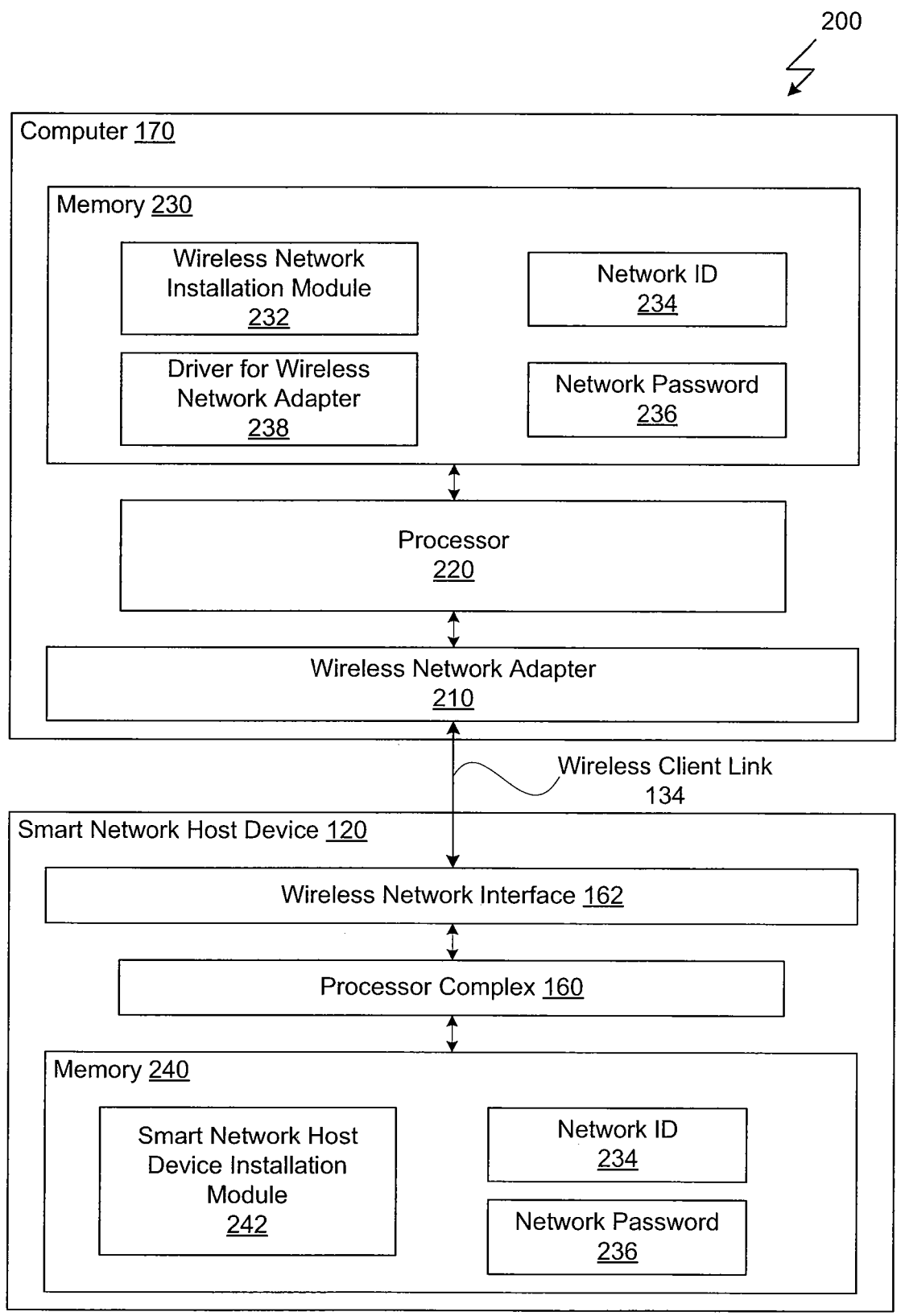
FIG. 2 is a more detailed illustration of a wireless connection established between the computer and the network host device of FIG. 1A, according to one example embodiment.

FIG. 2 is a more detailed illustration of a wireless connection established between the computer 170 and the smart network host device 120 of FIG. 1A, according to one example embodiment. As shown, the wireless network 200 includes computer 170 and smart network host device 120. Computer 170 includes a wireless network adapter 210, a processor 220, and a memory 230. The wireless network adapter 210 is connected with the smart network host device 120 over a wireless client link 134. One skilled in the art would realize that wireless network adapter 210 could be an internal wireless card or an external wireless card. In one embodiment, an external wireless card is connected with computer 170 via a universal serial bus (USB™) port. According to one embodiment, the wireless client link 134 is wireless connection that conforms to the IEEE 802.11 standard.

The processor 220 is configured to carry out processing tasks required by computer 170. For example, processor 220 may execute an operating system that schedules tasks to run on processor 220 as well as drivers configured to transmit and receive communications between one or more electrical components of computer 170. In one embodiment, the processor 220 comprises a central processing unit (CPU).

The memory 230 comprises a volatile memory accessible by processor 220, such as one or more dynamic random access memory (DRAM) devices. As shown, memory 230 includes a wireless network installation module 232, a network identifier (ID) 234, a network password 236, and a driver 238 for the wireless network adapter 210. In one embodiment, memory 230 may comprise both volatile memory as well as non-volatile memory such as a hard disk drive storage device or a flash memory device for long-term storage of software and data. In such embodiments, when computer 170 is powered on, processor 220 may be configured to load software and data from non-volatile memory into volatile memory for processing.

Wireless network installation module 232 is configured to setup the wireless network 200. In one embodiment, the wireless network installation module 232 is a software program that, when executed by processor 220, causes the wireless network adapter 210 to connect to the smart network host device 120 and configure the smart network host device 120 to establish a wireless home network. The network ID 234 is associated with the wireless client link 134 established between computer 170 and the smart network host device 120. In one embodiment, the wireless client link 134 is a secure connection established via an authentication routine performed using the network password 236. The network ID 234 and the network password 236 may be default settings associated with a wireless client link configured during the manufacture of the smart network host device 120. In one embodiment, the network ID 234 and the network password 236 are a service set identifier (SSID) associated with wireless client link 134 and a Wi-Fi Protected Access™ 2 (WPA2) security password, respectively. Persons skilled in the art would recognize that other implementations of the network ID 234 and the network password 236 may be used in conjunction with the techniques disclosed herein. Driver 238 is a device driver for use with an operating system executing on processor 220 and configured to enable applications executing on processor 220 to communicate via the wireless network adapter 210.

In one embodiment, the wireless network installation module 232 is used to configure the smart network host device 120. The smart network host device 120 includes a memory 240 that stores a smart network host device installation module 242 as well as a copy of the network ID 234 and a copy of the network password 236. The smart network host device installation module 242 is configured to communicate with the wireless network installation module 232 or a similar program to configure the smart network host device 120. Memory 240 may be a non-volatile memory such as a flash memory device.

In one embodiment, the smart network host device 120 is configured as a wireless access point that is capable of hosting multiple virtual access points over a single wireless network interface. A first virtual access point is associated with a service set identifier (SSID) that provides basic connectivity for computer 170 and/or one or more client devices 130 to attempt to connect to the smart network host device 120. In one embodiment, network ID 234 is a well-known SSID that is set by default during manufacture of the smart network host device 120. The well-known SSID may be the same for every smart network host device 120 sold by a manufacturer and may not be unique to the smart network host device 120 of a particular user. Similarly, network password 236 may be the same for every smart network host device 120 sold by a manufacturer and may not be unique to the smart network host device 120 of a particular user.

The wireless network installation module 232 may be configured to attempt to connect to any available wireless access points associated with the well-known SSID within range of the wireless network adapter 210. In one embodiment, the first virtual access point is not secured and network password 236 is not used in any type of authentication routine while establishing the wireless client link 134. In such embodiments, a second virtual access point may be associated with an SSID that is unique to the smart network host device 120 of a particular user. The wireless network installation module 232 may not know the SSID associated with the second virtual access point the first time the computer 170 attempts to connect to the smart network host device 120. Thus, the wireless network installation module 232 may be configured to establish a connection via the first virtual access point in order to attempt to authenticate the computer 170 with the smart network host device 120. If the computer 170 is authenticated, then the smart network host device 120 may transmit an SSID and a password associated with the second virtual access point to the computer 170. In a different embodiment, the wireless network installation module 232 may prompt the user to manually enter an SSID and password associated with the second virtual access point. For example, the SSID and password associated with the smart network host device 120 may be included on a sticker on the smart network host device 120. In another embodiment, the smart network host device 120 may include a USB™ port that, when connected to a USB™ memory device, may store network credentials associated with the second virtual access point on the USB™ memory device. The wireless network installation module 232 may be configured to read the network credentials from the USB memory device when the user connects the USB™ memory device to the computer 170.

In one embodiment, the computer 170 and the smart network host device 120 are configured to perform an authentication procedure based on the Extensible Authentication Protocol where a handshake is performed between the computer 170 and the smart network host device 120 to authenticate the network credentials without broadcasting the network credentials on the wireless link established via the first virtual access point. Based on the successful authentication of the computer 170 with the smart network host device 120, the smart network host device 120 may transmit the SSID associated with the second virtual access point to the computer 170 via the wireless link 134 associated with the first virtual access point. The computer 170 may store the SSID of the second virtual access point in the memory 230 so that the computer 170 can re-connect directly to the second virtual access point at a subsequent time without having to be authenticated via the first virtual access point.

In one embodiment, a third virtual access point is configured manually by an owner of the smart network host device 120, creating a unique SSID and credentials for the third virtual access point. The owner may establish a password to access the third virtual access point via well-known wireless security protocols such as Wi-Fi Protected Access 2 (WPA2) or Wired Equivalent Privacy (WEP) or any other technically equivalent security protocol. The computer 170 may store the SSID and the password for the third virtual access point in the memory 230 to facilitate re-connection to the third virtual access point on subsequent attempts to connect to the wireless network 200. In one embodiment, the first and second virtual access points are transparent to the owner and are configured to perform background functions for automatic discovery, connection, and provisioning of the wireless network 200 with the computer 170.

The wireless network installation module 232 as well as the smart network host device installation module 242 are software constructs embodied in one or more instructions that, when executed by a processor, are configured to cause the processor to perform various operations that realize the functionality of the described modules. One of ordinary skill in the art would readily appreciate that the functions of such software modules are performed by the processor that is executing the one or more instructions that are included in the software modules, and that any reference in the present specification to a software module performing an action may also be interpreted as the processor performing that action via execution of the instructions. In other embodiments, the functionality of the wireless network installation module 232 as well as the functionality of the smart network host device installation module 242 may be embodied in hardware units and may either be programmable or non-programmable.

Figure 3A:
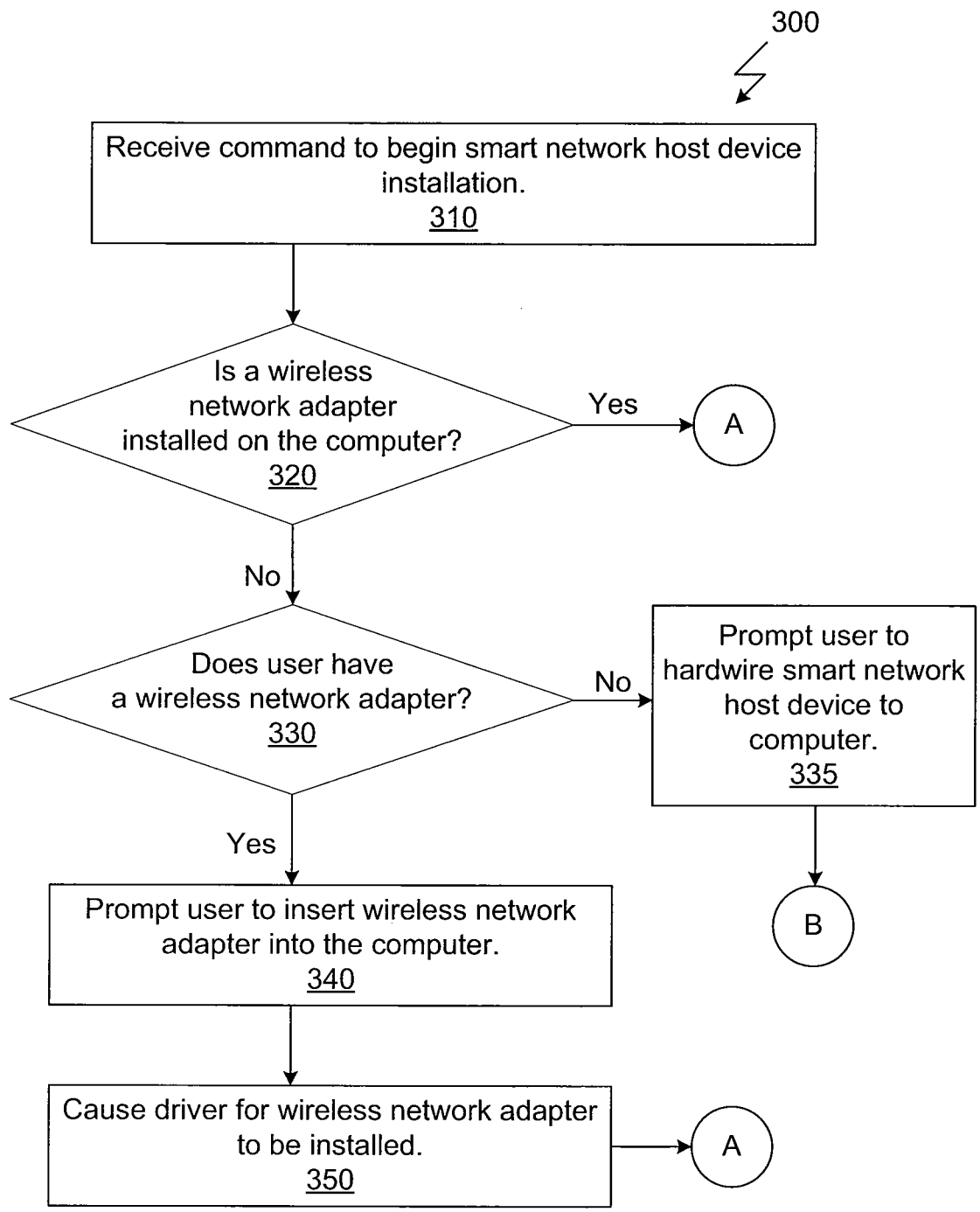
FIGS. 3A and 3B are a flow diagram of method steps for concurrent setup of a wireless network adapter and a network host device, according to one example embodiment.
Figure 3B:
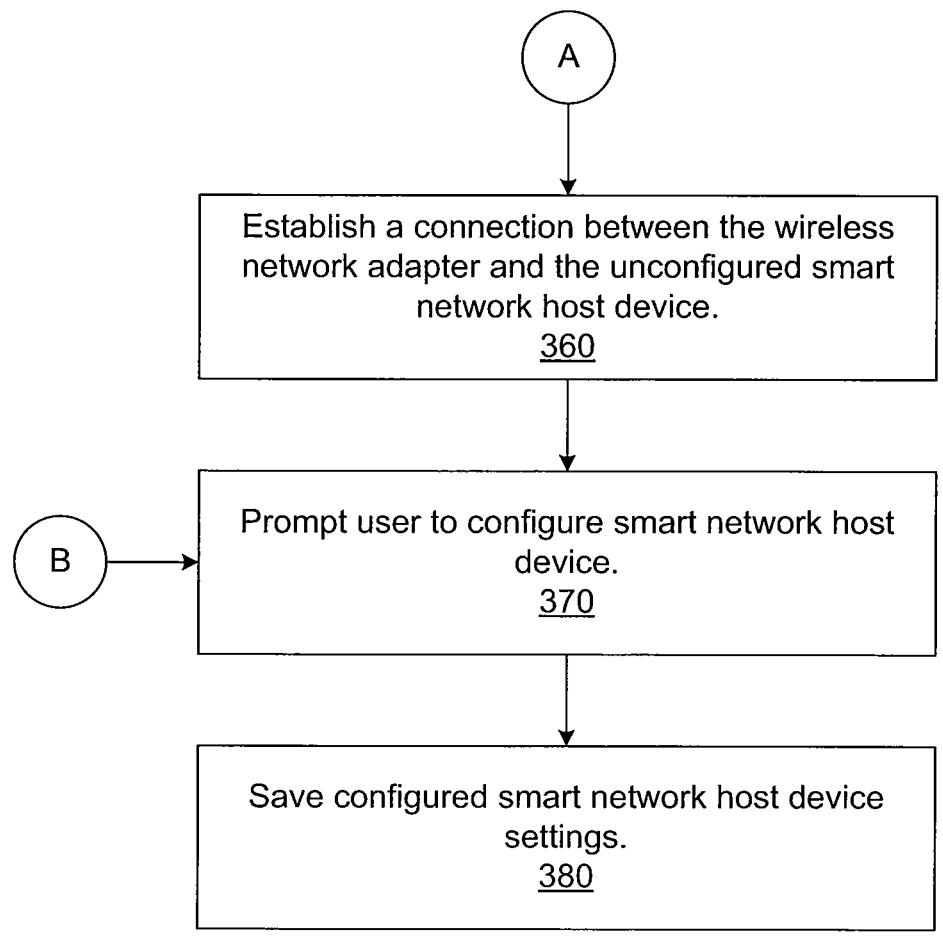

FIGS. 3A and 3B are a flow diagram of method steps for concurrent setup of a wireless network adapter 210 and a smart network host device 120, according to one example embodiment. Although the method steps are described in conjunction with FIGS. 1A-1F and 2, persons skilled in the art will understand that any system configured to perform the method steps, in any order, falls within the scope of the present disclosure.

The method 300 begins at step 310, where the wireless network installation module 232 receives a command to begin the configuration of the smart network host device 120. In one embodiment, the user inserts a disk into computer 170 which contains one or more commands that, when executed by processor 220, cause computer 170 to configure the smart network host device 120. At step 320, the wireless network installation module 232 determines whether a wireless network adapter 210 is installed in the computer 170. As is well understood, in one embodiment, a variable may be stored in a registry associated with the operating system of computer 170. The variable may indicate whether a wireless network adapter 210 is installed in the computer 170. The wireless network installation module 232 may be configured to check the registry to determine whether a wireless network adapter is installed in the computer 170. In another embodiment, the wireless network installation module 232 can determine whether a wireless network adapter 210 is available by attempting to wirelessly connect with the smart network host device 120. If the computer 170 cannot wirelessly connect with the smart network host device 120, then the smart network installation module 232 concludes that no wireless network adapter 210 is installed on computer 170. As persons skilled in the art would recognize, other techniques can be implemented to conclude that no wireless network adapter 210 is installed on computer 170.

If a wireless network adapter 210 is installed on the computer 170, then the method 300 proceeds to step 360, where the wireless network installation module 232 establishes a connection between the wireless network adapter 210 and the currently unconfigured smart network host device 120. In one embodiment, the wireless network installation module 232 attempts to connect to the first virtual access point. Once computer 170 is authenticated by the smart network host device 120, the wireless network installation module 232 may be configured to establish a secure connection via the second virtual access point. At step 370, the wireless network installation module 232 prompts a user to configure the smart network host device 120. In one embodiment, the wireless network installation module 232 prompts the user to enter configuration settings for the smart network host device 120, including a network identifier (ID) 234 and a network password 236. In another embodiment, the network ID 234 and the network password 236 are associated with a first virtual access point and the connection between the computer 170 and the first virtual access point is already established. In such embodiments, the user is prompted to enter an SSID and a password associated with a third virtual access point that is the primary channel for traffic transmitted over the wireless home network. The user may create the new SSID and new password to be unique for their wireless home network.

At step 380, the values received from the user are stored in the memory 230 of the computer 170. In addition, copies of the configuration settings entered by the user are transmitted to the smart network host device 120 and stored in memory 240. In one embodiment, the configuration settings are transmitted to the smart network host device 120 via wireless client link 134, which is established between the wireless network adapter 210 and the smart network host device 120. The smart network host device 120 is then configured to establish a third virtual access point that is associated with the new SSID and new password provided by the user. The SSID associated with the third virtual access point may be broadcast by the smart network host device 120 so that any wireless network interface within range of the smart network host device 120 may discover the wireless network 200.

Returning now to step 320, if the wireless network installation module 232 determines that a wireless network adapter 210 is not installed on the computer 170, then the method 300 proceeds to step 330, where the wireless network installation module 232 determines whether the user has a wireless network adapter 210 to install in the computer 170. In one embodiment, the determination as to whether the user has a wireless network adapter 210 to install is completed by prompting the user to either plug in a wireless network adapter 210 or to indicate that she does not have a wireless network adapter 210. If the user indicates that she does not have a wireless network adapter 210, then method 300 proceeds to step 335, where the user is prompted to hardwire the smart network host device 120 to the computer 170. In one embodiment, the hardwiring is accomplished via an Ethernet cable. After the user hardwires the smart network host device 120 to the computer 170, method 300 proceeds to step 370, as described above.

Returning now to step 330, if the user indicates that she has a wireless network adapter 210, then, at step 340, the user is prompted to insert the wireless network adapter 210 into the computer 170. At step 350, the wireless network installation module 232 causes the driver 238 for the wireless network adapter 210 to be installed. After the driver 238 for the wireless network adapter 210 is installed, method 300 proceeds to step 360, as described above.

Figure 4A:
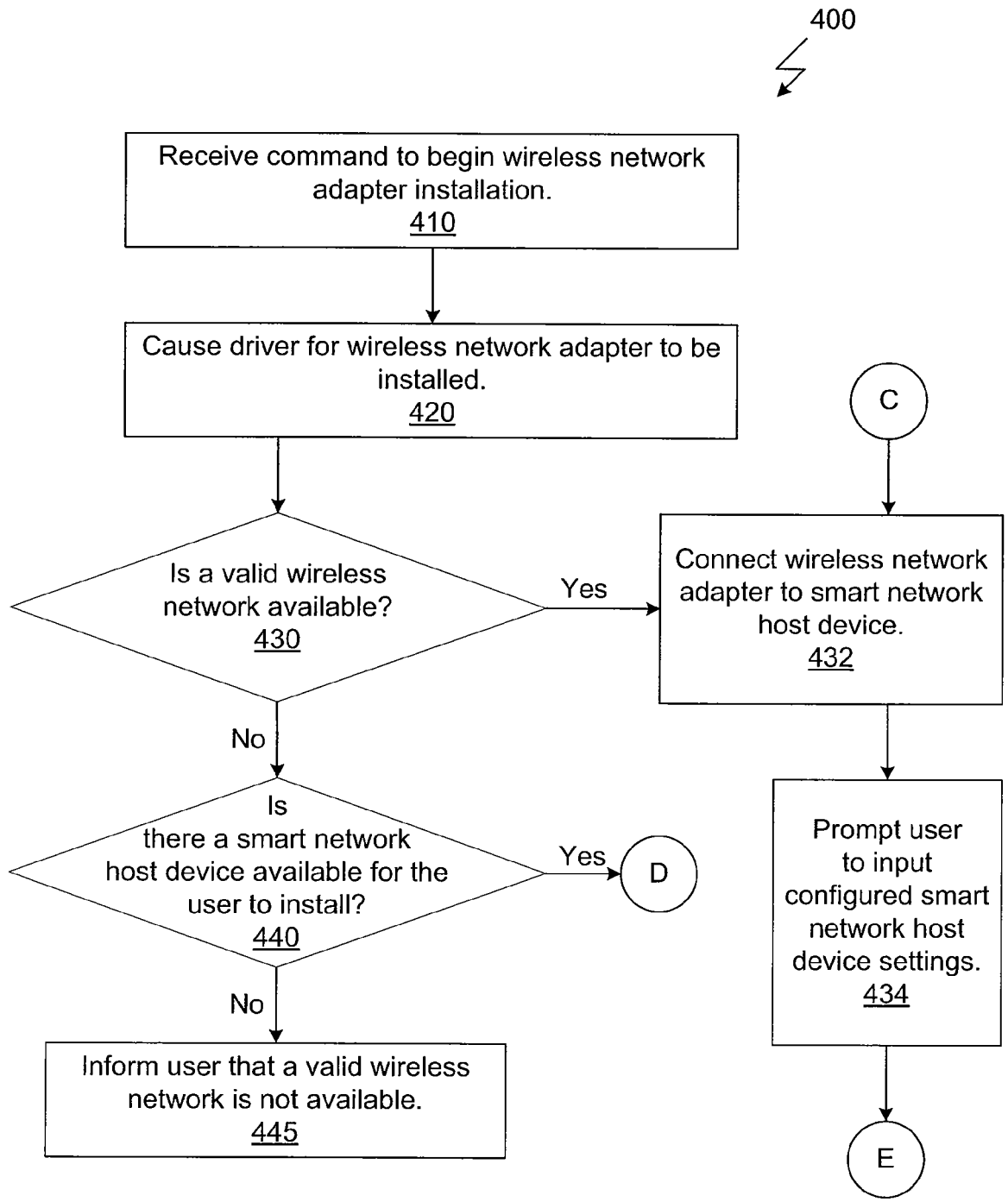
FIGS. 4A and 4B are a flow diagram of method steps for concurrent setup of a wireless network adapter and a network host device, according to another example embodiment.
Figure 4B:
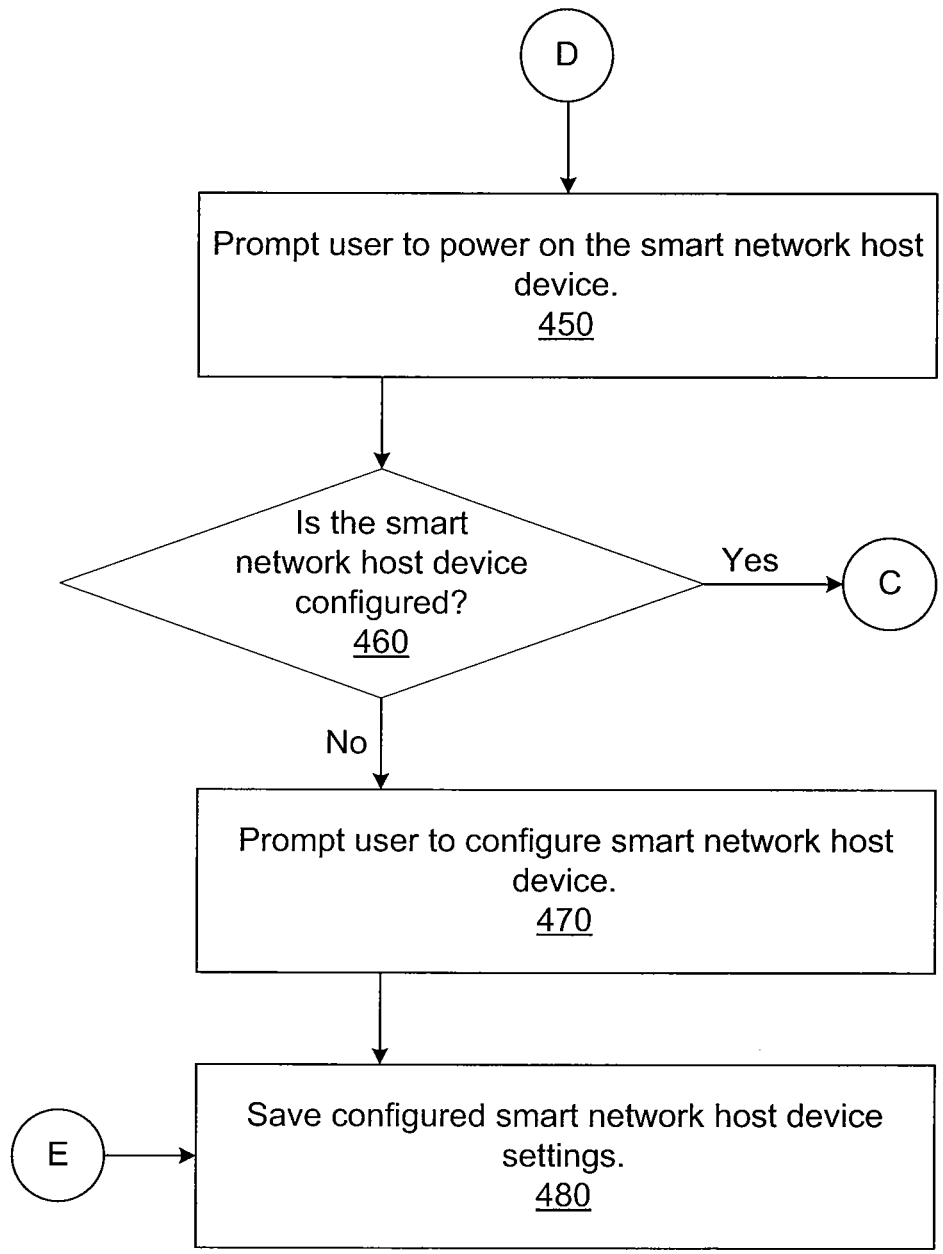

FIGS. 4A and 4B are a flow diagram of method steps 400 for concurrent setup of a wireless network adapter 210 and a smart network host device 120, according to another example embodiment. Although the method steps are described in conjunction with FIGS. 1A-1F and 2, persons skilled in the art will understand that any system configured to perform the method steps, in any order, falls within the scope of the present disclosure.

The method 400 begins at step 410, where the wireless network installation module 232 receives a command to begin the installation of the wireless network adapter 210. In one embodiment, the wireless network installation module 232 receives this command the first time a user plugs the wireless network adapter 210 into the computer 170. In another embodiment, the user inserts an installation disk into computer 170 that instructs the computer 170 to install the wireless network adapter 210. At step 420, the wireless network installation module 232 causes the driver 238 for the wireless network adapter 210 to be installed. The driver 238 may be stored in the memory 230 of computer 170.

At step 430, the wireless network installation module 232 determines whether a valid wireless network is available to which the wireless network adapter 210 can be connected. A valid wireless network is a wireless network associated with a configured smart network host device 120 owned by the user. As is well understood, in some circumstances, no wireless networks are available. In other circumstances, a wireless network may be available but the wireless network adapter 210 may not be able to connect to the wireless network. In yet other circumstances, a plurality of wireless networks may be available. If a wireless network is available to which the wireless network adapter 210 can be connected, then the method 400 proceeds to step 432. At step 432, the wireless network installation module 232 causes the wireless network adapter 210 to establish a connection to the smart network host device 120.

In one embodiment, if more than one wireless network is available, then the wireless network installation module 232 may prompt the user to select the wireless network to establish a connection with, such as in step 434, where the wireless network installation module 232 prompts the user to input the network credentials such as the network ID 234 and the network password 236. Method 400 then proceeds to step 480. In another embodiment, the wireless network installation module 232 may determine which wireless network to connect to based on pre-defined criteria such as the characteristics of the SSIDs of the different wireless networks or a strength of the signal associated with the different wireless networks. In alternative embodiments, step 434 may be skipped and the method 400 proceeds directly from step 432 to step 480. At step 480, the network host device settings are received from the user and stored in memory 230. In one embodiment, the network host device settings are transmitted to smart network host device 120, so that the network host device installation module 242 can store the network host device settings or verify that the user entered a valid password. After step 480, method 400 terminates.

Returning now to step 430, if the wireless network installation module 232 determines that a valid wireless network is not available, then method 400 proceeds to step 440. At step 440, the wireless network installation module 232 determines whether a smart network host device 120 is available for the user to configure. In one embodiment, the user is prompted to provide an input indicating whether she has a smart network host device 120 to install. In another embodiment, the wireless network installation module 232 attempts to connect to a virtual wireless access point associated with a well-known SSID. If the connection fails, then the wireless network installation module 232 determines that a smart network host device 120 is not available, and method 400 proceeds to step 445, where the wireless network installation module 232 informs the user that a valid wireless network is not available and method 400 terminates. However, if a smart network host device 120 is available to install, then method 400 proceeds to step 450, where the wireless network installation module 232 prompts the user to power on the smart network host device 120.

Next, at step 460, the wireless network installation module 232 causes the wireless network adapter 210 to connect to the smart network host device 120 and determine whether the smart network host device 120 is configured. If the smart network host device 120 is already configured, then method 400 proceeds to step 432, as described above. However, if the smart network host device 120 is not yet configured, then method 400 proceeds to step 470, where the wireless network installation module 232 prompts the user to configure the smart network host device 120. In one embodiment, the wireless network installation module 232 prompts the user to enter the network host device settings, such as by providing a unique SSID and password to associate with a third wireless virtual access point. At step 480, the configured smart network host device 120 settings are stored in both the memory 230 of the computer 170 and the memory 240 of the smart network host device 120, as described above. Then, method 400 terminates.

In sum, the techniques disclosed above provide a more user-friendly approach to setting up a home wireless network when a wireless network adapter and a network host device are installed in parallel. More specifically, with one technique, a command to begin the installation of the network host device is received. Upon receiving this command, the wireless network installation module detects that a wireless network adapter is not installed on the computer and asking the user to insert the wireless network adapter. Next, the wireless network adapter driver is installed, and the wireless network adapter connects the computer with the unconfigured network host device. Following this step, the user is prompted to enter configuration settings for the network host device, including a network ID and a smart network password, and the configuration settings are saved. Another technique involves detecting that a wireless network adapter is connected to the computer and installing the wireless network adapter driver. The wireless network installation module then determines that the user has a network host device to install, prompts the user to insert the network host device installation disk, and installs the network host device. Installing the network host device involves prompting the user to enter configuration settings for the network host device, and saving the configured network host device settings.

One advantage of the disclosed approach is that a user can install and configure both a wireless network adapter and a network host device in parallel in a user-friendly and efficient manner. The approach automatically detects the presence, or lack thereof, of network elements and changes the setup procedure based on the detection of necessary elements. As a result, the process of setting up a home wireless network is greatly simplified.

One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments, other and further embodiments may be devised without departing from the basic scope thereof. Therefore, the scope of the present disclosure is determined by the claims that follow.

We claim:

1. A method, comprising:
   receiving a request to install either a wireless network adapter or a network host device;
   if the request is to install the wireless network adapter:
      detecting that the network host device is not yet installed, and
      prompting a user to plug in the network host device; or
   if the request is to install the network host device:
      detecting that the wireless network adapter is not yet installed, and
      prompting the user to plug in the wireless network adapter;
   causing a first connection to be established between the wireless network adapter and a first virtual access point of the network host device based on a network identifier and a network password for the first virtual access point;
   receiving, from the network host device, a network identifier (ID) and a network password for a second virtual access point of the network host device; and
   causing a second connection to be established between the wireless network adapter and the second virtual access point.

2. The method of claim 1, wherein the network ID and the network password of the first virtual access point are defined during manufacturing of the network host device and the wireless network adapter to establish the first and second connections without requiring user input, wherein the network host device is configured to store a network state model that includes representations of different computing devices in a network associated with the network host device and different services provided by the network.

3. The method of claim 1, wherein the request is to install the wireless network adapter, and wherein detecting that the network host device is not yet installed comprises attempting and failing to detect a wireless network.

4. The method of claim 1, wherein the request is to install the wireless network adapter, and wherein detecting that the network host device is not yet installed comprises:
   detecting at least one wireless network; and
   receiving input from the user indicating that the at least one wireless network is not associated with the network host device.

5. The method of claim 1, wherein the request is to install the wireless network adapter, and further comprising causing a software driver associated with the wireless network adapter to be installed.

6. The method of claim 1, wherein the request is to install the network host device, and detecting that the wireless network adapter is not yet installed comprises attempting and failing to cause the first and second connections to be established between a computer associated with the wireless network adapter and the network host device.

7. The method of claim 6, further comprising causing a software driver associated with the wireless network adapter to be installed.

8. The method of claim 1, further comprising:
   prompting the user to define a network identifier (ID) and a network password for a third virtual access point of the network host device;
   saving the network ID and the network password to a memory in a computing device associated with the wireless network adapter;
   transmitting the network ID and the network password for the third virtual access point from the memory to the network host device; and
   causing a third connection to be established between the wireless network adapter and the third virtual access point.

9. The method of claim 8, wherein transmitting the network ID and the network password for the third virtual access point from the memory to the network host device is accomplished via one of the first and second connections established between the wireless network adapter and the network host device, the method further comprising terminating the first connection after establishing the second connection.

10. A non-transitory computer-readable medium storing instructions that, when executed by a processing unit, cause the processing unit to perform the steps of:
   receiving a request to install either a wireless network adapter or a network host device;
   if the request is to install the wireless network adapter:
      detecting that the network host device is not yet installed, and
      prompting a user to plug in the network host device; or
   if the request is to install the network host device:
      detecting that the wireless network adapter is not yet installed, and
      prompting the user to plug in the wireless network adapter;
   causing a first connection to be established between the wireless network adapter and a first virtual access point of the network host device based on a network identifier and a network password for the first virtual access point;
   receiving, from the network host device, a network identifier (ID) and a network password for a second virtual access point of the network host device; and
   causing a second connection to be established between the wireless network adapter and the second virtual access point.

11. The computer-readable medium of claim 10, wherein the network ID and the network password of the first virtual access point are defined during manufacturing of the network host device and the wireless network adapter to establish the first and second connections without requiring user input, wherein the network host device is configured to store a network state model that includes representations of different computing devices in a network associated with the network host device and different services provided by the network.

12. The computer-readable medium of claim 10, wherein the request is to install the wireless network adapter, and wherein detecting that the network host device is not yet installed comprises attempting and failing to detect a wireless network.

13. The computer-readable medium of claim 10, wherein the request is to install the wireless network adapter, and wherein detecting that the network host device is not yet installed comprises:
   detecting at least one wireless network; and
   receiving input from the user indicating that the at least one wireless network is not associated with the network host device.

14. The computer-readable medium of claim 10, wherein the request is to install the wireless network adapter, and wherein the instructions further comprise causing a software driver associated with the wireless network adapter to be installed.

15. The computer-readable medium of claim 10, wherein the request is to install the network host device, and detecting that the wireless network adapter is not yet installed comprises attempting and failing to cause the first and second connections to be established between a computer associated with the wireless network adapter and the network host device.

16. The computer-readable medium of claim 10, wherein the instructions further comprise causing a software driver associated with the wireless network adapter to be installed.

17. The computer-readable medium of claim 10, wherein the instructions further comprise:
   prompting the user to define a network identifier (ID) and a network password for a third virtual access point of the network host device;
   saving the network ID and the network password to a memory in a computing device associated with the wireless network adapter;
   transmitting the network ID and the network password for the third virtual access point from the memory to the network host device; and
   causing a third connection to be established between the wireless network adapter and the third virtual access point.

18. The computer-readable medium of claim 17, wherein transmitting the network ID and the network password for the third virtual access point from the memory to the network host device is accomplished via one of the first and second connections established between the wireless network adapter and the network host device, the method further comprising terminating the first connection after establishing the second connection.

19. A system, comprising:
   one or more computer processors; and a memory containing a program which when executed by the one or more computer processors, performs an operation comprising:

receiving a request to install either a wireless network adapter or a network host device; if the request is to install the wireless network adapter: detecting that the network host device is not yet installed, and prompt a user to plug in the network host device; or if the request is to install the network host device:

detecting that the wireless network adapter is not yet installed, and prompting the user to plug in the wireless network adapter; and causing a first connection to be established between the wireless network adapter and a first virtual access point of the network host device based on a network identifier and a network password for the first virtual access point;

receiving, from the network host device, a network identifier (ID) and a network password for a second virtual access point of the network host device; and causing a second connection to be established between the wireless network adapter and the second virtual access point.

20. The system of claim 19, wherein the network ID and the network password of the first virtual access point are defined during manufacturing of the network host device and the wireless network adapter to establish the first and second connections without requiring user input, wherein the network host device is configured to store a network state model that includes representations of different computing devices in a network associated with the network host device and different services provided by the network.

* * * * *